(12) United States Patent
Hou (10) Patent No.: US 11,969,914 B2
(45) Date of Patent: Apr. 30, 2024

(54) THREE-DIMENSIONAL PRINTING EQUIPMENT AND SCRAPER ASSEMBLY THEREFOR

(71) Applicant: PRISMLAB CHINA LTD., Shanghai (CN)

(72) Inventor: Feng Hou, Shanghai (CN)

(73) Assignee: PRISMLAB CHINA LTD., Shanghai (CN)

( * ) Notice: Subject to any disclaimer, the term of this patent is extended or adjusted under 35 U.S.C. 154(b) by 160 days.

(21) Appl. No.: 17/344,965

(22) Filed: Jun. 11, 2021

(65) Prior Publication Data

US 2021/0323191 A1 Oct. 21, 2021

Related U.S. Application Data

(63) Continuation of application No. PCT/CN2019/123536, filed on Dec. 6, 2019.

(30) Foreign Application Priority Data

Dec. 11, 2018 (CN) .......................... 201811509626.X (51) Int. Cl.
  *B33Y 30/00* (2015.01)
  *B28B 1/00* (2006.01)
(52) U.S. Cl.
  CPC .............. *B28B 1/001* (2013.01); *B33Y 30/00* (2014.12)
(58) Field of Classification Search
  None
  See application file for complete search history.

(56) References Cited

U.S. PATENT DOCUMENTS

2003/0059492 A1  3/2003  Gaillard et al.
2007/0298182 A1  12/2007  Perret et al.
(Continued)

FOREIGN PATENT DOCUMENTS

CN  205110037 U  3/2016
CN  105946239 A  9/2016
(Continued)

OTHER PUBLICATIONS

International Search Report of PCT/CN2019/123536.
Supplementary European Search Report of EP 19897158.2 dated Aug. 8, 2022.

*Primary Examiner* — Yung-Sheng M Tsui
(74) *Attorney, Agent, or Firm* — Kilpatrick Townsend & Stockton LLP (57) ABSTRACT

The present disclosure relates to a scraper component of a three-dimensional printing device, which includes a scraper, a fixing frame, a pulley and a sliding rail, the scraper is installed on the fixing frame, and the pulley is set on at least one end of the fixing frame; the sliding rail has a horizontal first rail and a tilted and movable second rail, and a first end of the second rail is connected to the first rail and a second end is located on the first rail; when the pulley slides from a middle to an end of the first rail, the pulley enters the second rail from the first end and leaves the second rail from the second end then comes back to the first rail; when the pulley slides from an end to a middle of the first rail, the pulley passes through the second rail from below. The scraper of the present disclosure can push the printing slurry to the side plate of the storage tank without squeezing the slurry out of the storage tank, and can better push the printing slurry with high viscosity or low fluidity.

7 Claims, 12 Drawing Sheets

(56) References Cited

U.S. PATENT DOCUMENTS

| | | | |
|---|---|---|---|
| 2015/0224710 A1 | 8/2015 | El-Siblani | |
| 2015/0343533 A1* | 12/2015 | Park | B22F 3/18 |
| | | | 425/375 |
| 2016/0288412 A1 | 10/2016 | Stampfl et al. | |
| 2017/0057177 A1 | 3/2017 | Ferguson et al. | |
| 2017/0106443 A1 | 4/2017 | Karlsson | |
| 2017/0355100 A1 | 12/2017 | Pateloup et al. | |
| 2019/0047220 A1* | 2/2019 | Ojima | B33Y 70/00 |
| 2021/0197481 A1* | 7/2021 | Ewald | B33Y 30/00 |

FOREIGN PATENT DOCUMENTS

| | | |
|---|---|---|
| CN | 108656308 A | 10/2018 |
| CN | 108724430 A | 11/2018 |
| CN | 209208089 U | 8/2019 |
| CN | 209718634 U | 12/2019 |
| JP | 2007203696 A | 8/2007 |

\* cited by examiner

THREE-DIMENSIONAL PRINTING EQUIPMENT AND SCRAPER ASSEMBLY THEREFOR

FIELD

The present disclosure relates to a three-dimensional printing device, and more specifically, to a three-dimensional printing device and a scraper component thereof.

BACKGROUND

Three-dimensional printing (3D printing) technology is based on the computer three-dimensional design model, through the software layered discretization and numerical control molding system, using laser beams, hot melt nozzles and other methods to stack and bond special materials such as metal powder, ceramic powder, plastic, and cell tissue layer by layer, and finally superimposing to form a physical product. Unlike traditional manufacturing that uses molds, turn-milling and other mechanical processing methods to shape and cut raw materials to produce final products, three-dimensional printing transforms three-dimensional entities into several two-dimensional planes, and by processing materials and superimposing them layer by layer, the complexity of manufacturing is greatly reduced. This digital manufacturing mode does not require complex processes, large machine tools, or a lot of manpower. Various parts with complex shapes can be generated directly from computer graphics data, so that manufacturing can be extended to a wider range of production groups.

At present, the molding methods of 3D printing technology are still evolving, and the materials used are also diverse. Among various molding methods, the photo-curing method is a more mature method. The photo-curing method uses the principle that the photo-curable material is cured after being irradiated by ultraviolet light to perform material accumulation molding, which has the characteristics of high molding accuracy, good surface finish, and high material utilization.

A photo-curing type three-dimensional printing device is provided with an exposure system at the bottom of a storage tank, and the beam pattern projected by the exposure system irradiates a layer of photo-curing material at the bottom of the storage tank through a transparent bottom plate of the storage tank to cure it. The cured photo-curing material will be bonded to the bottom surface of the carrier. Each time the exposure system irradiates the beam pattern to cause a layer of photo-curing material to be cured, the carrier will rise slightly to pull the formed layer of photo-curing material, and allow the photo-curing material that is still liquid to flow between the bottom of the storage tank and the cured material to wait for the next irradiation. In such cycle, a three-dimensional workpiece that is accumulated layer by layer will be obtained. In order to prevent the photo-curing material at the bottom of the storage tank from being gradually cured under long-term light leakage, a scraper will be used to scrape along the inner bottom surface of the storage tank to remove the remaining photo-curing material after the carrier is lifted.

Three-dimensional printers have been used to prepare high-strength ceramic products. It is to load slurry or paste with ceramic powder dispersed in a photo-curing material into a storage tank, and print according to the above-mentioned method. However, as the filling rate of inorganic materials increases, the fluidity of the printing slurry or paste will decrease. In this case, the original scraping method will cause some problems. For example, when the scraper pushes the slurry to move closer to the side wall of the storage tank, a large amount of the pushed slurry cannot be dispersed around the storage tank in time, and it is easy to be squeezed out of the storage tank by the scraper from above the side wall.

SUMMARY

The present disclosure provides a three-dimensional printing device and a scraper component thereof, which can avoid squeezing the slurry out of the storage tank when pushing the printing slurry.

According to other embodiments of the present disclosure, a scraper component of a three-dimensional printing device is provided. The scraper component comprising a scraper, a fixing frame, a pulley and a sliding rail, the scraper is installed on the fixing frame, the pulley is set on at least one end of the fixing frame, which is characterized in that, the sliding rail has a horizontal first rail and a tilted and movable second rail, a first end of the second rail is connected to the first rail and a second end is located on the first rail; when the pulley slides from a middle to an end of the first rail, the pulley enters the second rail from the first end and leaves the second rail from the second end then comes back to the first rail; when the pulley slides from an end to a middle of the first rail, the pulley passes through the second rail from below.

In one embodiment, a rotating shaft is above the first rail, and a groove is provided in a position of the first rail corresponding to the first end of the second rail, the groove occupies a part of the width of the first rail, the first end of the second rail is placed in the groove, and the second end is set on the rotating shaft.

In one embodiment, each first rail has two ends, and the two ends are corresponding to two second rails respectively.

In one embodiment, the scraper component has two first rails and two sets of the pulley, the two sets of pulleys are respectively placed at both ends of the fixing frame, and each set of the pulley is adapted to slide on one of the first rails.

In one embodiment, the scraper has at least one long hole perpendicular to the extension direction of the scraper, and the scraper is installed on the fixing frame through the long hole.

In one embodiment, the scraper is rigid.

In one embodiment, the bottom surface of the scraper for scraping is smooth.

In one embodiment, the scraper component further includes a driving mechanism, which is for driving the fixing frame to move along the sliding rail, the driving mechanism includes a motor, a transmission shaft, two transmission gears and two conveyor belts, the transmission shaft is connected to a output shaft of the motor, the two transmission gears are set at both ends of the transmission shaft, the two conveyor belts are respectively driven by the two transmission gears, and the two ends of the fixing frame are respectively set on the two conveyor belts.

Another embodiment of the present disclosure provides a three-dimensional printing device, which is characterized by comprising the above-mentioned scraper component.

In one embodiment, the scraper component further includes a photodetector adjacent to both ends of a first rail.

The present disclosure adopts the above embodiments, and compared with the prior art, when the scraper moves to a position close to the side plate of the storage tank, it will rise firstly under the guidance of the sliding rail, so that the printing slurry can be released from between the scraper and the bottom surface of the storage tank; then the scraper will drop and return to its original height. In this way, when the scraper pushes the printing slurry to the side plate of the storage tank, it will not squeeze the slurry out of the storage tank. In addition, the use of rigid materials of the scraper can better promote high-viscosity or low-fluidity printing slurry, such as printing slurry containing ceramic powder. Furthermore, the bottom surface of the scraper used for scraping is smooth, which can reduce friction and make it easier to slide. In addition, both ends of the scraper component are driven by conveyor belts, so that the driving force is strong, which is to the benefit of pushing high viscosity or low fluidity printing slurry.

BRIEF DESCRIPTION OF THE DRAWING(S)

In order to make the above-mentioned embodiments of the present disclosure more understandable, the specific implementations of the present disclosure will be described in detail below with reference to the accompanying drawings, in which.

DETAILED DESCRIPTION

The embodiments of the present disclosure will become more readily appreciated by reference to the following detailed description of the embodiments, when taken in conjunction with the accompanying drawings.

In the following description, many specific details are set forth in order to fully understand the present disclosure, but the present disclosure can also be implemented in other ways different from those described herein, so the present disclosure is not limited by the specific embodiments disclosed below.

When describing the embodiments of the present disclosure in detail, for the convenience of description, the cross-sectional view showing the device structure will not be partially enlarged according to the general scale, and the schematic diagram is only an example, which should not limit the scope of protection of the present disclosure. In addition, the three-dimensional dimensions of length, width and depth should be included in the actual production.

As shown in the present disclosure and the claims, unless the context clearly indicates exceptions, the words "a", "an" and/or "the" do not specifically refer to the singular, but may also include the plural. Generally speaking, the terms "comprising" and "including" only suggest that the clearly identified steps and elements are included, and these steps and elements do not constitute an exclusive list, and the method or device may also include other steps or elements.

When describing the embodiments of the present disclosure in detail, for the convenience of description, the cross-sectional view showing the device structure will not be partially enlarged according to the general scale, and the schematic diagram is only an example, which should not limit the scope of protection of the present disclosure. In addition, the three-dimensional dimensions of length, width and depth should be included in the actual production.

For the convenience of description, spatial relation words such as "under", "below", "lower", "underneath", "above", "on", etc. may be used herein to describe an element or a feature or the relationship between one element or feature and other elements or features shown in the drawings. It will be understood that these spatial relationship terms are intended to include directions other than those depicted in the drawings of the device in use or operation. For example, if the device in the drawings is turned over, the orientation of elements described as "below" or "beneath" or "under" other elements or features will be changed to be "above" the other elements or features. Thus, the exemplary terms "below" and "under" can include both directions of up and down. The device may also have other orientations (rotated by 90 degrees or in other directions), so the spatial relationship descriptors used here should be explained accordingly. In addition, it will also be understood that when a layer is referred to as being "between" two layers, it can be the only layer between the two layers, or one or more intervening layers may also be present.

In the context of the present disclosure, the described structure in which the first feature is "on" the second feature may include an embodiment in which the first and second features are formed in direct contact, or may include an embodiment in which other features are formed between the first and second features, which the first and second features may not be in direct contact.

Figure 1:
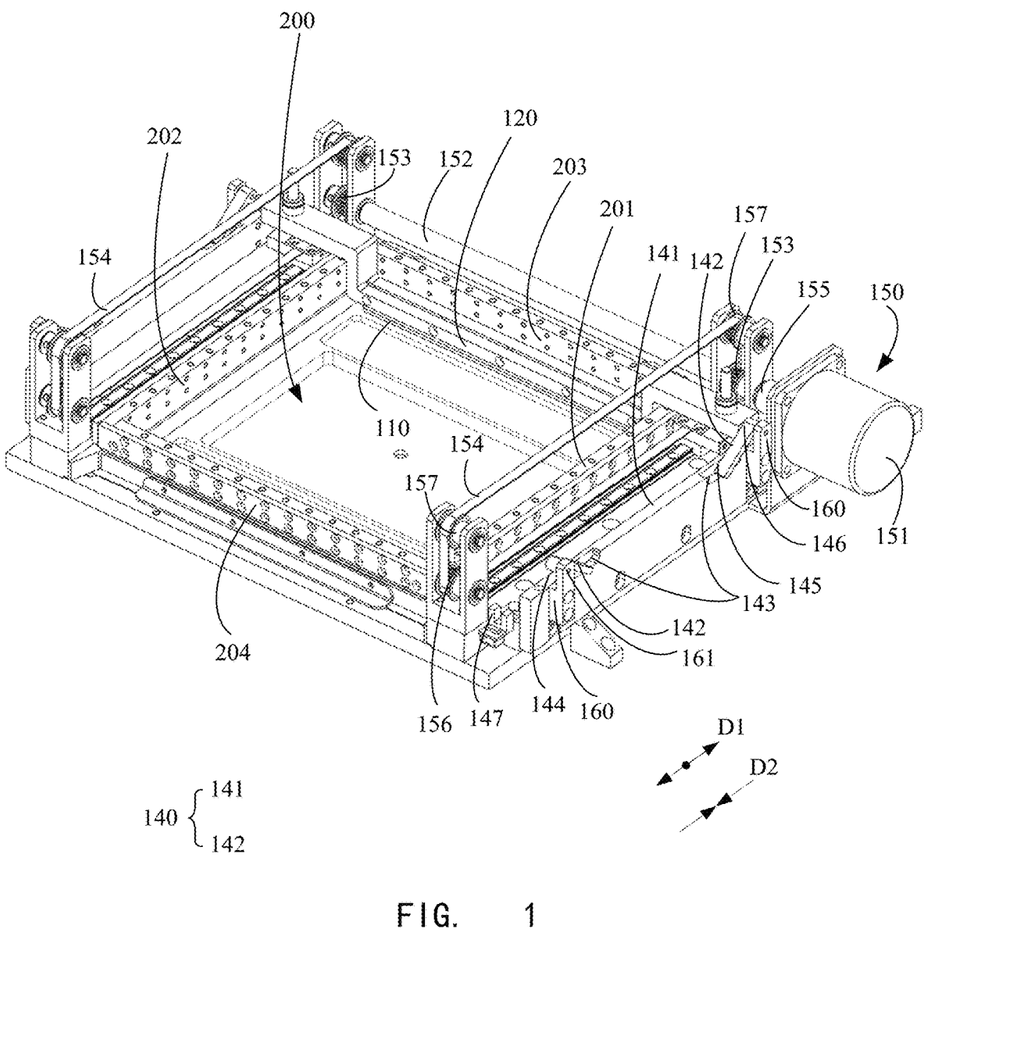
FIG. 1 is a three-dimensional schematic diagram of a three-dimensional printing device with a scraper component according to an embodiment of the present disclosure.

FIG. 1 is a three-dimensional schematic diagram of a three-dimensional printing device with a scraper component 100 of an embodiment of the present disclosure. As shown in FIG. 1, the 3D printing device has a storage tank 200, which is used to load the 3D printing slurry. Generally, the shape of the storage tank 200 is rectangular, with a bottom plate and four side plates. For the convenience of subsequent explanation, the four side plates of the storage tank 200 are respectively called the first side plate 201, the second side plate 202, the third side plate 203 and the fourth side plate 204. The scraper component 100 includes a scraper 110, a fixing frame 120, a pulley 130 and a sliding rail 140.

The fixing frame 120 straddles the two side plates at opposite positions of the storage tank 200, and the fixing frame 120 shown in FIG. 1 is across the first side plate 201 and the second side plate 202 of the storage tank 200. It is understood that, FIG. 1 is an example, and the fixed frame 120 can also straddle the third side plate 203 and the fourth side plate 204. The fixed frame 120 is of a concave shape with high ends and low middle. Both ends of the fixing frame 120 are higher than the side plates of the storage tank 200, the middle section is lower which goes deep into the tank of the storage tank 200, and is higher than the bottom plate of the storage tank 200. The overall length of the fixing frame 120 is greater than the distance between the two side plates of the storage tank 200 which the fixing frame 120 straddles, that is to say, both ends of the fixing frame 120 are out of the two side plates of the storage tank 200.

The scraper 110 is installed in the middle part of the fixing frame 120. The installed scraper 110 is just fit with the bottom plate of the storage tank 200. In this way, when the fixing frame 120 slides along the sliding rail 140, the scraper 110 can be driven to move to remove the curing materials remaining on the bottom plate of the storage tank 200. It is understood that the length of the scraper 110 is less than the length of the side of the bottom plate of the storage tank 200, and the side is parallel to the scraper 110, so that the scraper 110 can move smoothly in the storage tank 200.

Referring to FIG. 1, there are a number of circular holes on the middle section of the fixing frame 120. In one embodiment, the scraper 110 has at least one long hole perpendicular to the extending direction of the scraper, and the position of the long hole corresponds to the position of the circular hole on the fixing frame 120. Align the long hole on the scraper 110 with the circular hole on the fixing frame 120, and then fix the scraper 110 onto the fixing frame 120 by bolts and other workpieces. Adjust the relative position of the long hole on the scraper 110 and the circular hole on the fixing frame 120 according to needs, and then the height of the scraper 110 can be adjusted, that is to say, the distance between the scraper 110 and the bottom of the storage tank 200 can be adjusted.

Figure 2:
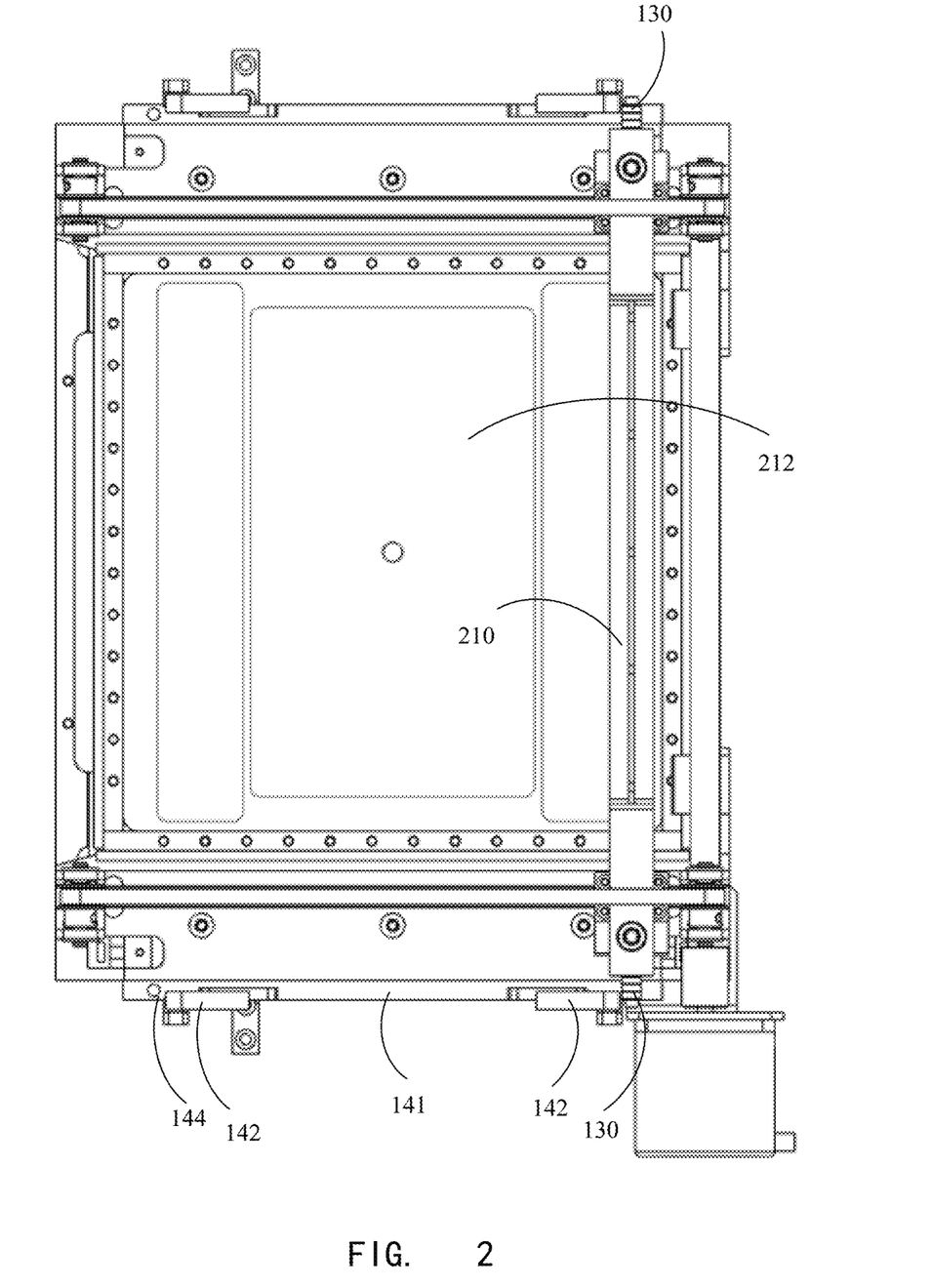
FIG. 2 is a top view of a three-dimensional printing device with a scraper component according to an embodiment of the present disclosure.

At least one end of the fixing frame 120 is provided with a pulley 130. FIG. 2 shows an embodiment in which a pulley 130 is provided at each end of the fixing frame 120. The function of the pulley 130 is that when the fixed frame 120 is moving, the pulley 130 moves along the sliding rail 140, and the pulley 130 contacts the sliding rail 140.

The sliding rail 140 is composed of two parts, including a first rail 141 extending in a horizontal direction and a second rail 142 that is tilted and movable. The first rail 141 is in the shape of a rectangular plate, standing on the outside the side plate of the storage tank 200, and parallel to the side plate of the storage tank 200 straddled by the fixing frame 120, with its narrow side facing upward as a rail. As shown in FIG. 1, the first rail 141 is parallel to the first side plate 201 of the storage tank 200 and is located outside the first side plate 201. The first rail 141 is also located below the end of the fixing frame 120. When the fixing frame 120 is moving, the pulley 130 provided at the end of the fixing frame 120 moves along the first rail 141.

The second rail 142 has a rectangular plate shape. Compared with the first rail 141, the second rail 142 has a smaller size. In one embodiment, the second rail 142 is located at the end 144 of the first rail 141. The second rail 142 includes a first end 145 and a second end 146. The first end 145 of the second rail 142 is in movable contact with the first rail 141. In an embodiment, the first rail 141 has a groove 143 at a position corresponding to the first end of the second rail 142. The groove 143 occupies a part of the width of the first rail 141. As shown in FIG. 1, the groove 143 is located outside the first rail 141 to ensure that the pulley 130 can move smoothly on the first rail 141. The first end 145 of the second rail 142 is placed inside the groove 143.

The second end 146 of the second rail 142 is located above the first rail 141, and is connected to a supporting frame 160 through a rotating shaft 161. The second end 146 of the second rail 142 can rotate around the rotating shaft 161. The supporting frame 160 is fixed on the outer side of the end 144 of the first rail 141, and is used to fix the second end 146 of the second rail 142 through the rotating shaft 161.

When the 3D printing device starts the scraper component 100, the fixed frame 120 will move along the first side plate 201 and the second side plate 202 of the storage tank 200. At this time, the pulley 130 located at the end of the fixed frame 120 will slide along the first rail 141. When the pulley 130 moves in the first direction D1, that is, when it moves from the middle to the end 144 of the first rail 141, the pulley 130 will enter the first end 145 of the second rail 142, and move upward along the tilted surface of the second rail 142, and when the pulley 130 reaches the second end 146 of the second rail 142, it leaves the second rail 142 and falls back onto the first rail 141 below.

When the pulley 130 moves in the second direction D2, that is, when it moves from the end 144 to the middle of the first rail 141, it passes through the second rail 142 from below the second rail 142. When the pulley 130 passes the first end 145 of the second rail 142, since the first end 145 is movable, the first end 145 will be pushed up by the pulley 130. After the pulley 130 passes the first end 145, the first end 145 falls back into the groove 143 of the first rail 141 again under the action of gravity.

With this technical solution, when the scraper 110 moves to a position close to the side plate of the storage tank 200, it will rise firstly under the guidance of the sliding rail 140, so that the printing slurry can be released between the scraper 110 and the inner bottom surface of the storage tank 200; then the scraper 110 will drop, and return to its original height. In this way, the scraper 110 pushes the printing slurry to the side plate of the storage tank 200 without squeezing the printing slurry out of the storage tank 200.

In one embodiment, one end 144 of the first rail 141 is correspondingly configured with a second rail 142. In another embodiment, both ends 144 of the first rail 141 are correspondingly configured with two second rails 142 respectively. It can be understood that the configuration of the two second rails 142 is to prevent the slurry from being squeezed out of the storage tank 200 when the scraper 110 scrapes back and forth in both directions.

In addition, it can be understood that the pulley 130 and the sliding rail 140 in the present disclosure are configured as a set. In one embodiment, only one end of the fixing frame 120 is provided with a pulley 130, and a sliding rail 140 is provided outside the corresponding side of the storage tank 200. In one embodiment, pulleys 130 are provided at both ends of the fixing frame 120. Correspondingly, sliding rails 140 are provided on both sides of the storage tank 200, as shown in FIG. 1.

Referring to FIG. 1, the scraper component 100 of the present disclosure further includes a driving mechanism 150 for driving the fixing frame 120 to move along the sliding rail 140. The driving mechanism 150 includes a motor 151, a transmission shaft 152, a transmission gear 153 and a conveyor belt 154.

The motor 151 is fixedly installed on the outside of the storage tank 200 for generating driving power. The transmission shaft 152 is a cylindrical long shaft, which is arranged on the outside of the storage tank 200, and its height is higher than the height of the side plate of the storage tank 200.

The transmission shaft 152 is arranged parallel to the extending direction of the scraper 110. The transmission shaft 152 is located outside the third side plate 203 of the storage tank 200 and is parallel to the third side plate 203, and its length is slightly longer than the length of the third side plate 203. The transmission shaft 152 is connected with the output shaft 155 of the motor 151. When the motor 151 drives the output shaft 155 to rotate, it also drives the transmission shaft 152 to rotate at the same time.

A transmission gear 153 is provided at each end of the transmission shaft 152. Two conveyor belts 154 are respectively located at both ends of the fixing frame 120, and are arranged perpendicular to the extending direction of the scraper 110. The conveyor belt 154 is parallel to the first side plate 201 of the storage tank 200. One end of the conveyor belt 154 bypasses the transmission gear 153, and the other end bypasses the first interlocking shaft 156 arranged outside the first side plate 201 of the storage tank 200. The height of the first interlocking shaft 156 and the transmission gear 153 is the same, so that the conveyor belt 154 provided between the first interlocking shaft 156 and the transmission gear 153 is in a horizontal state. The conveyor belt 154 is connected to the end of the fixing frame 120 so that the fixing frame 120 can move along the sliding rail 140 under the driving of the conveyor belt 154. When the motor 151 works, the transmission gear 153 rotates, driving the conveyor belt 154 to run between the transmission gear 153 and the first interlocking shaft 156, and at the same time driving the fixing frame 120 to move, and further driving the scraper 110 to move. It can be understood that, in this embodiment, the position and size of the transmission gear 153 and the first interlocking shaft 156 need to be considered not to hinder the movement of the fixing frame 120 along the sliding rail 140.

In an embodiment, the driving mechanism 150 further includes two second interlocking shafts 157. One second interlocking shaft 157 is fixedly installed above the transmission gear 153 and not in contact with the transmission gear 153, and the other second interlocking shaft 157 is fixedly installed above the first interlocking shaft 156 and not in contact with the first interlocking shaft 156. The height of the two second interlocking shafts 157 is the same, so that the conveyor belt 154 arranged between the two second interlocking shafts 157 is in a horizontal state. One end of the conveyor belt 154 bypasses the transmission gear 153 and the second interlocking shaft 157 at the same time, and the other end of the conveyor belt 154 bypasses the first interlocking shaft 156 and the second interlocking shaft 157 above at the same time. The conveyor belt 154 encloses the transmission gear 153, the first interlocking shaft 156, and the two second interlocking shafts 157, and is supported by these components. As shown in FIG. 1, the two second interlocking shafts 157 increase the distance between back and forth directions of the conveyor belt 154, and provide enough space for the end of the fixing frame 120 to move along the sliding rail 140.

It can be understood that, corresponding to the two ends of the fixing frame 120, two sets of transmission gear 153, conveyor belt 154, first interlocking shaft 156 and a second interlocking shaft 157 are provided at symmetrical positions on both outer sides of the storage tank 200. The driving mechanism 150 can provide a relatively strong driving force for the scraper component 100, which is beneficial for the scraper 110 to push the printing slurry with high viscosity or low fluidity.

In other embodiment, the driving mechanism for driving the fixing frame 120 to move along the sliding rail 140 may also be a linear motor or other devices that can generate driving force.

In an embodiment, the three-dimensional printing device of the present disclosure further includes a photodetector 147. The photodetector 147 is adjacent to both ends of the first rail 141. FIG. 1 shows a photodetector 147 adjacent to one end of the first rail 141. Due to the viewing angle, another photodetector 147 adjacent to the other end of the first rail 141 is not shown in FIG. 1, and the positions of the two photodetectors 147 are symmetrical to each other. When the fixing frame 120 moves along the sliding rail 140 to the end 144 of the first rail 141, the photodetector 147 detects the position of the fixing frame 120 and makes a determination. When the fixing frame 120 has reached the preset position, the photodetector 147 sends out an in-position signal (INPOS), and instructing the motor 151 of the driving mechanism 150 to stop working or change direction. The photodetector 147 can provide an indication for the position of the scraper component 100 to move, to realize the automatic operation of the scraper component 100.

FIG. 2 is a top view of a three-dimensional printing device with a scraper component 100 according to an embodiment of the present disclosure. Referring to FIG. 2, the position of the pulley 130 in this embodiment can be described more clearly. The pulley 130 is located at the end of the fixing frame 120 and above the first rail 141. The two second rails 142 are respectively located at the two ends 144 of the first rail 141.

Figure 3A:
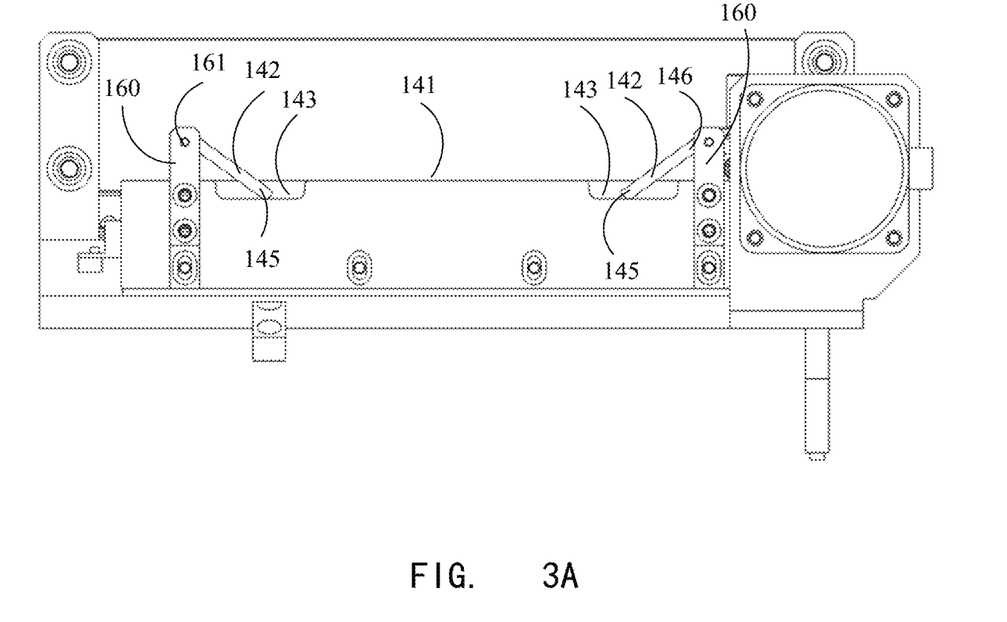
FIG. 3A is a left side view of the three-dimensional printing device corresponding to FIG. 1.
Figure 3B:
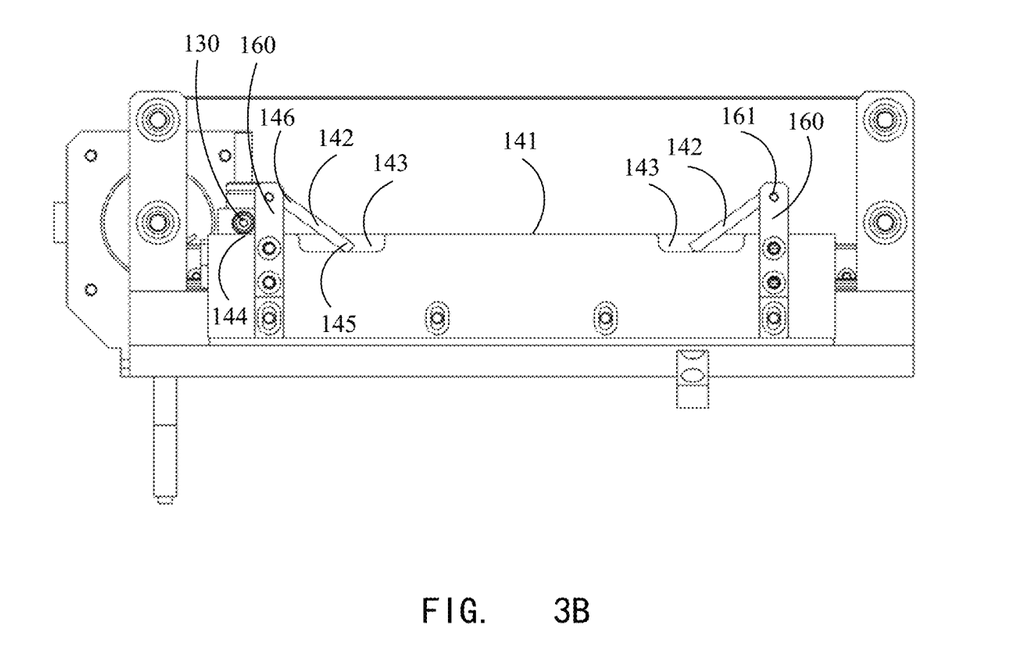
FIG. 3B is a right side view of the three-dimensional printing device corresponding to FIG. 1.

FIGS. 3A and 3B respectively correspond to the left side view and the right side view of the three-dimensional printing device shown in FIG. 1, and can clearly show the position and height relationship between the components shown. Referring to FIGS. 3A and 3B, the sliding rails 140 and related components on both sides of the fixing frame 120 are symmetrically distributed. A supporting frame 160 is respectively provided at each of the two ends 144 close to the first rail 141, and the supporting frame 160 is higher than the first rail 141. A rotating shaft 161 is provided at the upper end of the supporting frame 160 for fixing the second end 146 of the second rail 142 through the rotating shaft 161. A groove 143 is provided at a position of the first rail 141 corresponding to the first end 145 of the second rail 142, and the groove 143 has a depth. The first end 145 of the second rail 142 is movably disposed inside the groove 143. There is a height difference between the positions of the first end 145 and the second end 146 of the second rail 142, so that in a natural state, the second rail 142 is tilted.

As shown in FIG. 3B, the pulley 130 at one end of the fixing frame 120 is located at one end 144 of the first rail 141 at this time. The pulley 130 is a roller with a circular cross section. Its diameter is smaller than the distance between the rotating shaft 161 on the supporting frame 160 and the first rail 141, so that the pulley 130 can pass under the second rail 142. When the pulley 130 moves from the end 144 to the middle of the first rail 141, it first passes underneath the second end 146 of the second rail 142. After that, the pulley 130 gradually lifts the second rail 142 up, and makes the first end 145 of the second rail 142 leave the groove 143 on the first rail 141. After the pulley 130 has completely passed the second rail 142, the first end 145 of the second rail 142 falls back into the groove 143 of the first rail 141 under the action of gravity.

Figure 4:
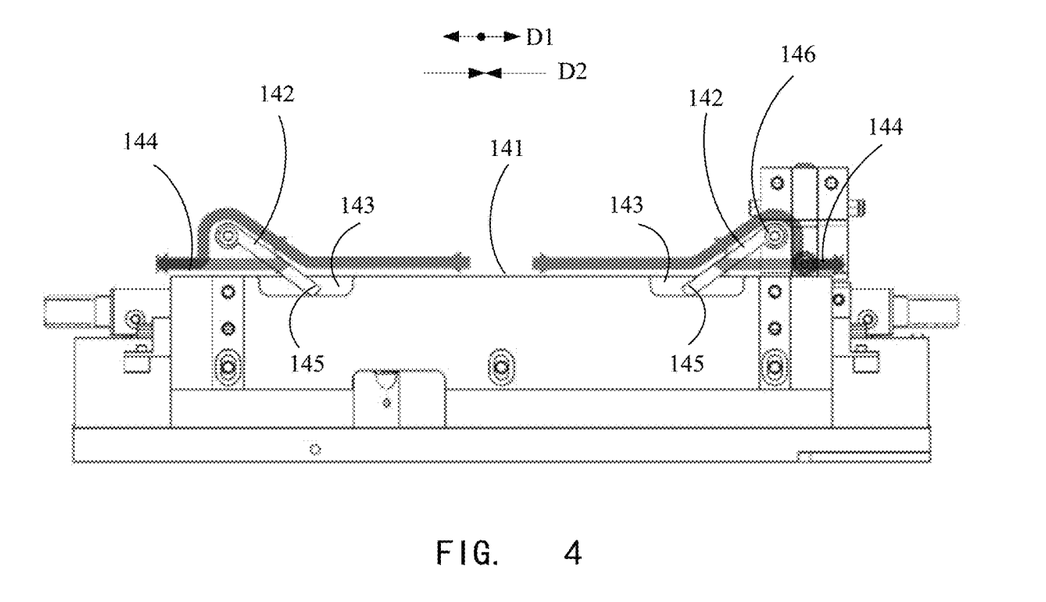
FIG. 4 is a schematic diagram of the movement route of the scraper component according to an embodiment of the present disclosure.

FIG. 4 is a schematic diagram of a moving route of the scraper component 100 according to an embodiment of the present disclosure. When the three-dimensional printing device is in the process of printing, the scraper component 100 is located inside a side of the storage tank 200. When the scraper component 100 is required to work, the scraper component 100 starts to move from one end of the first rail 141 to the other end of the first rail 141, and stays at the other end, waiting for the next time the scraper component 100 is required to work, then goes back to one end of the first rail 141 along the same route. Referring to FIG. 4, the moving direction of the scraper component 100 is divided into two kinds, which are the first direction D1 when moving from the middle to the end 144 of the first rail 141, and the second direction D2 when moving from the end 144 to the middle of the first rail 141.

Figure 5A:
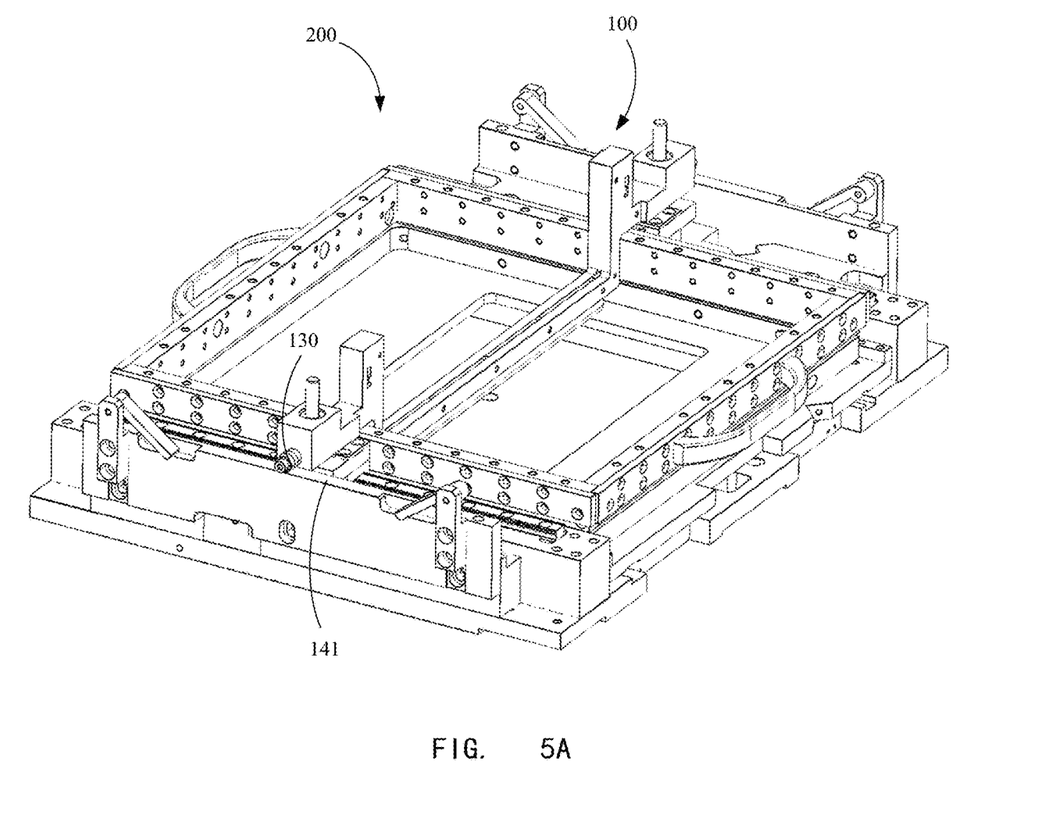
FIG. 5A is a three-dimensional schematic view of the scraper component in the first position during the movement of an embodiment of the present disclosure.
Figure 5B:
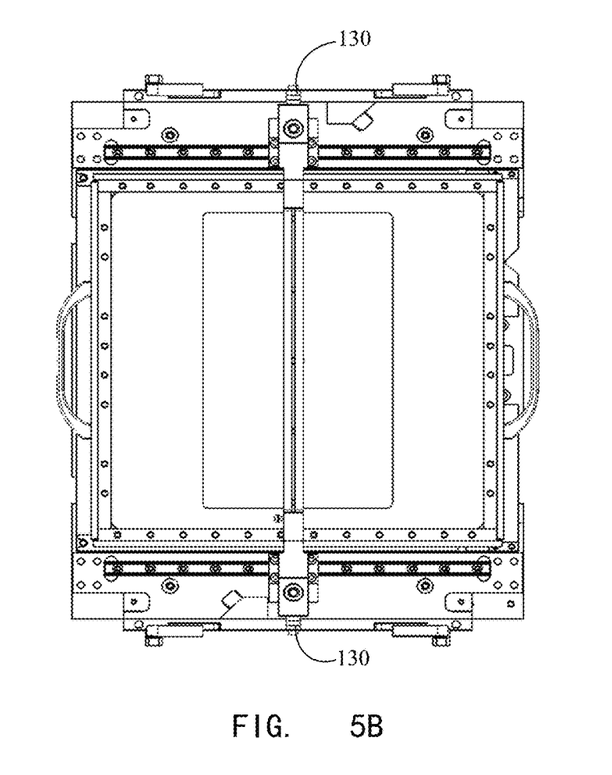
FIG. 5B is a top view of the scraper component in the first position during movement of an embodiment of the present disclosure.
Figure 5C:
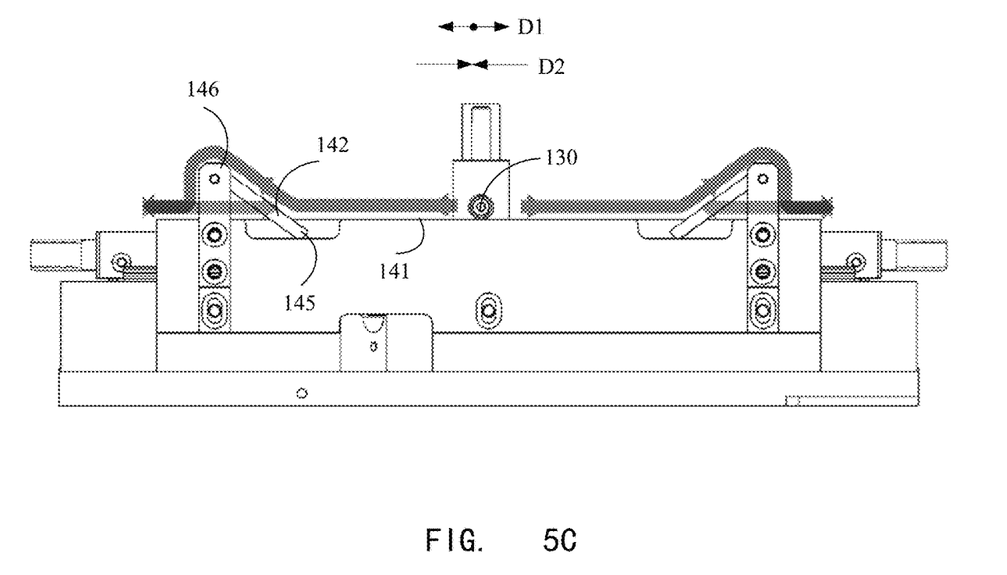
FIG. 5C is a side view of the scraper component in the first position during movement of an embodiment of the present disclosure.
Figure 6A:
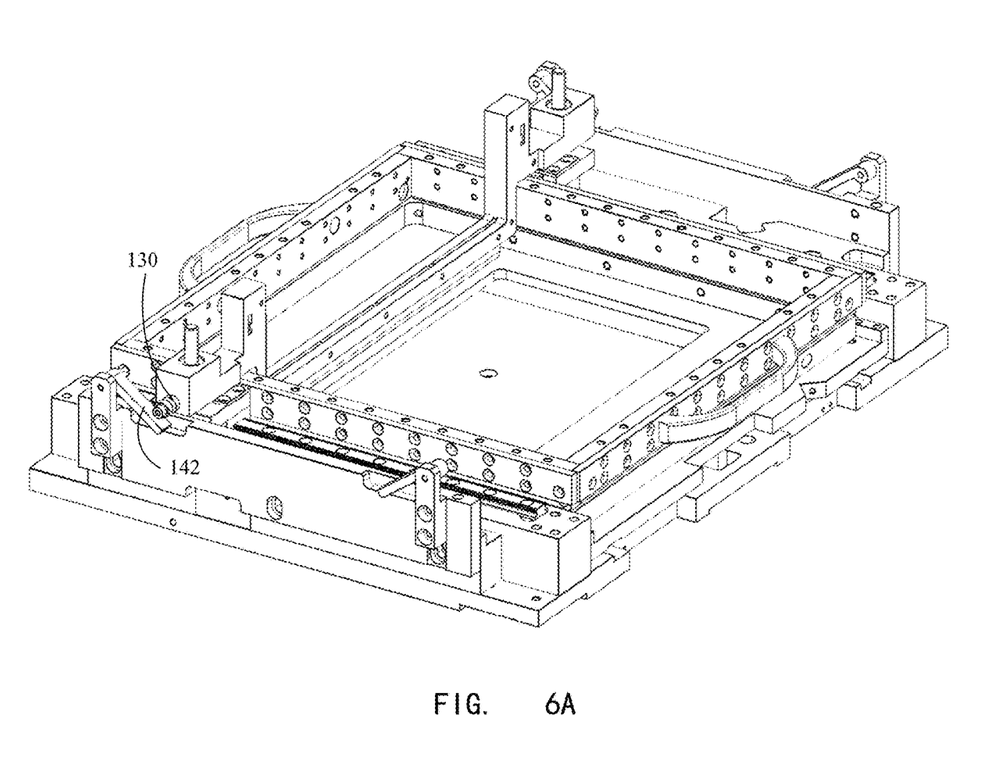
FIG. 6A is a three-dimensional schematic view of the scraper component in a second position during movement of an embodiment of the present disclosure.
Figure 6B:
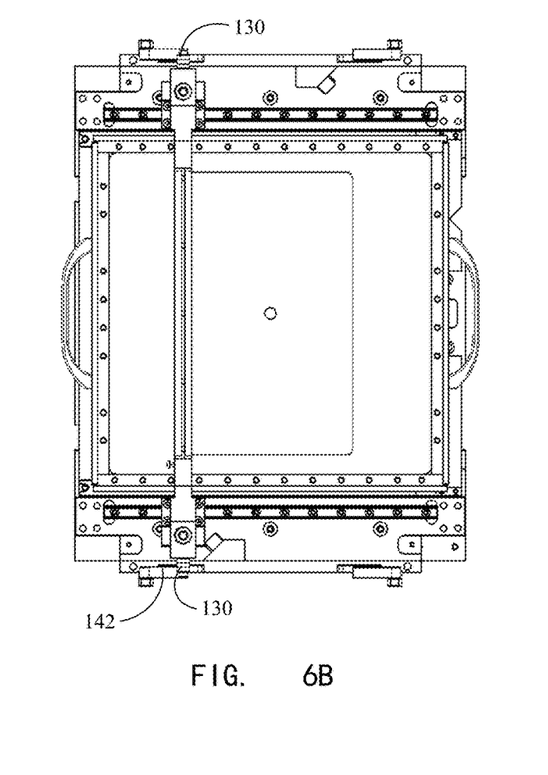
FIG. 6B is a top view of the scraper component in the second position during movement of an embodiment of the present disclosure.
Figure 6C:
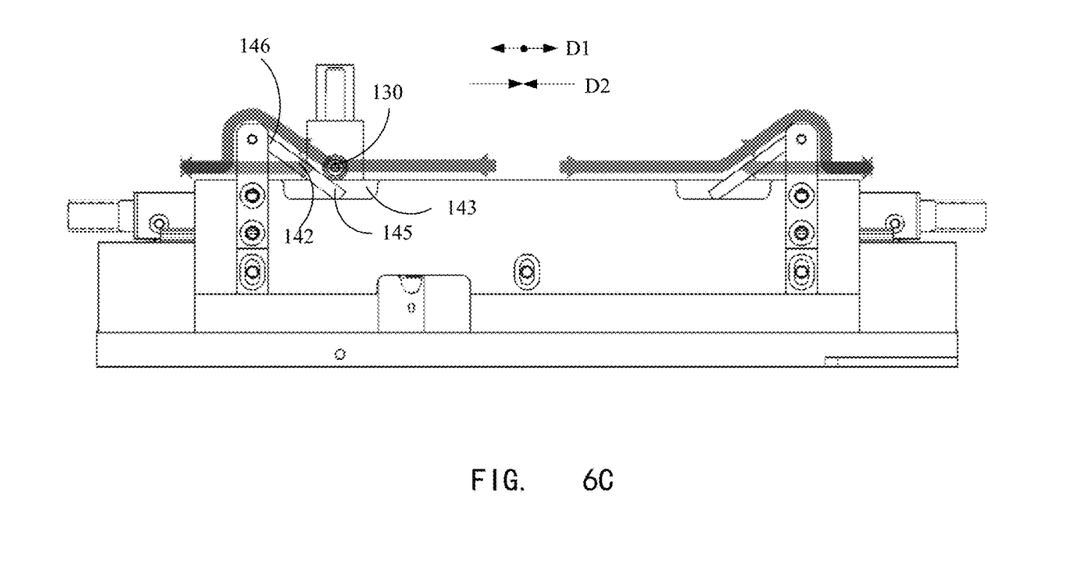
FIG. 6C is a side view of the scraper component in the second position during movement of an embodiment of the present disclosure.
Figure 7A:
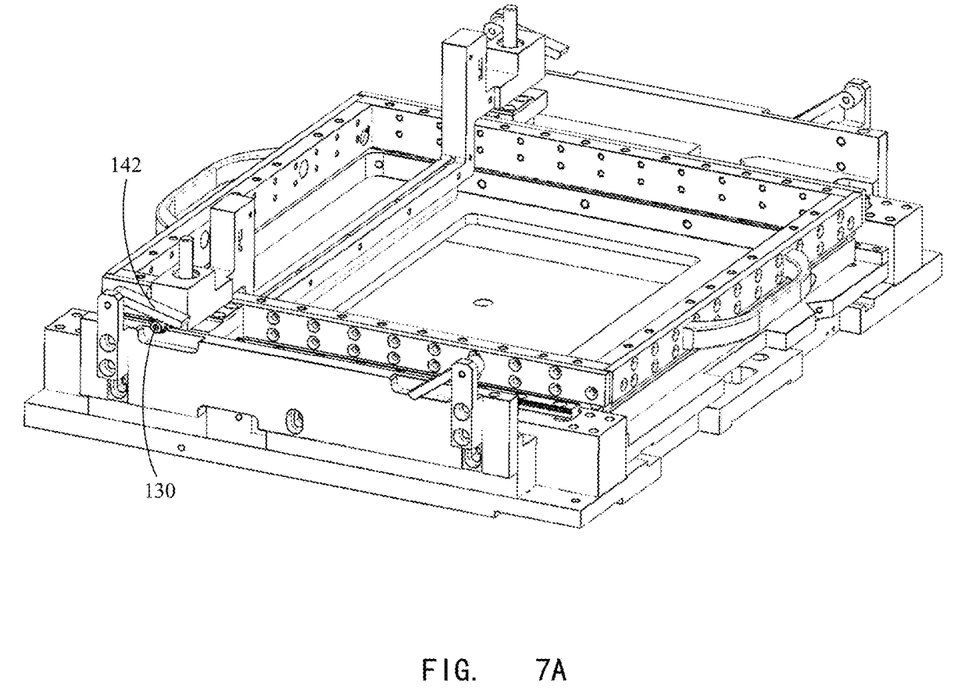
FIG. 7A is a p three-dimensional schematic view of the scraper component in the third position during the movement of an embodiment of the present disclosure.
Figure 7B:
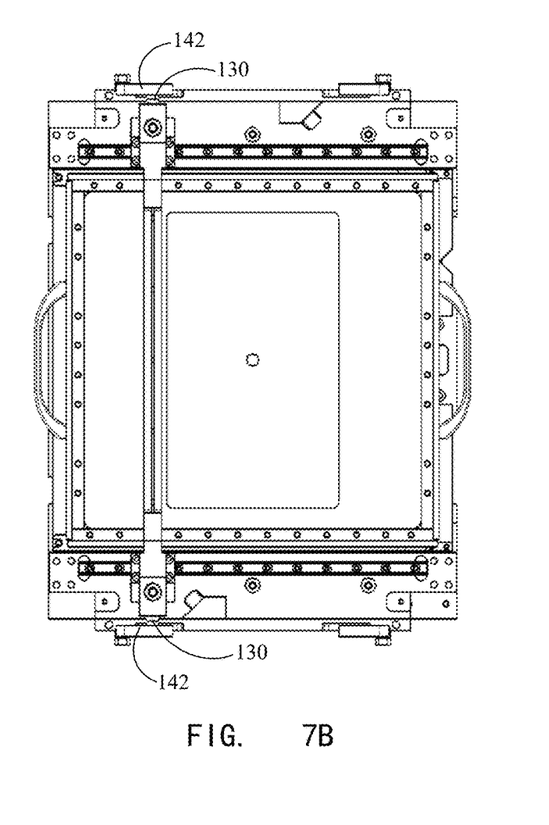
FIG. 7B is a top view of the scraper component in the third position during movement of an embodiment of the present disclosure.
Figure 7C:
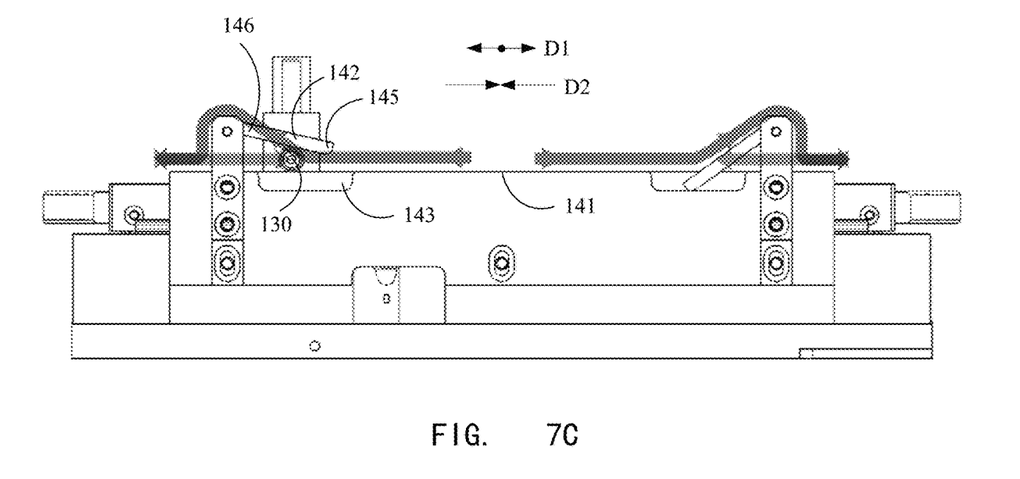
FIG. 7C is a side view of the scraper component in the third position during the movement of an embodiment of the present disclosure.

FIGS. 5 to 7 show schematic diagrams of the scraper component 100 in different positions during the movement.

FIGS. 5A-5C show schematic diagrams when the scraper component 100 is in the first position, that is, when the scraper component 100 moves to the middle of the storage tank 200. Referring to FIGS. 5A and 5B, at this time, the pulleys 130 located at both ends of the fixing frame 120 in the scraper component 100 are located in the middle of the first rail 141, and the pulleys 130 are in contact with the first rail 141. FIG. 5C also shows a route along which the pulleys 130 in the first position may move. When the scraper component 100 moves in the first direction D1, for example, when it moves to the left, the pulley 130 first moves to the left along the first rail 141 until it approaches the second rail 142 on the left of the first rail 141, and the pulley 130 enters the first end 145 of the second rail 142 and move upward along the tilted surface of the second rail 142. When the pulley 130 reaches the second end 146 of the second rail 142, it will leave the second rail 142 and fall back onto the first rail 141 below.

FIGS. 6A-6C show schematic diagrams when the scraper component 100 is in the second position, that is, when the scraper component 100 is about to reach the side of the storage tank 200. Referring to FIGS. 6A and 6B, at this time, the pulleys 130 located at both ends of the fixing frame 120 in the scraper component 100 are located on the second rail 142, indicating that the pulleys 130 are moved from the first position to the second position, that is, moving along the first direction D1. Referring to FIG. 6C, the pulley 130 has just reached the first end 145 of the second rail 142, and will continue to move upward along the tilted surface of the second rail 142. When the pulley 130 reaches the second end 146 of the second rail 142, it will leave the second rail 142 and fall back onto the first rail 141 below.

FIG. 7A-7C show schematic diagrams when the scraper component 100 is in the third position, that is, when the scraper component 100 moves from the side of the storage tank 200 to the middle to the position below the second rail 142. Referring to FIGS. 7A and 7B, in this embodiment, the scraper component 100 moves from the left side to the middle of the storage tank 200. At this time, the pulley 130 moves on the first rail 141, and the position of the pulley 130 is just below the second rail 142. When the pulley 130 is about to pass the first end 145 of the second rail 142, since the first end 145 is movable, the first end 145 will be pushed up by the pulley 130. After the pulley 130 passes the first end 145, the first end 145 falls back into the groove 143 of the first rail 141 again under the action of gravity. After that, the scraper component 100 continues to move to the right side of the storage tank 200, and the pulley 130 successively passes the first position and the second position, passes the second rail 142, and falls back onto the first rail 141 below.

It is understandable that the movement process of the scraper component 100 is mainly illustrated by the three position states of FIGS. 5 to 7. In some embodiments, infer the other states when the scraper component 100 is in positions other than the positions shown in FIGS. 5 to 7.

Figure 8A:
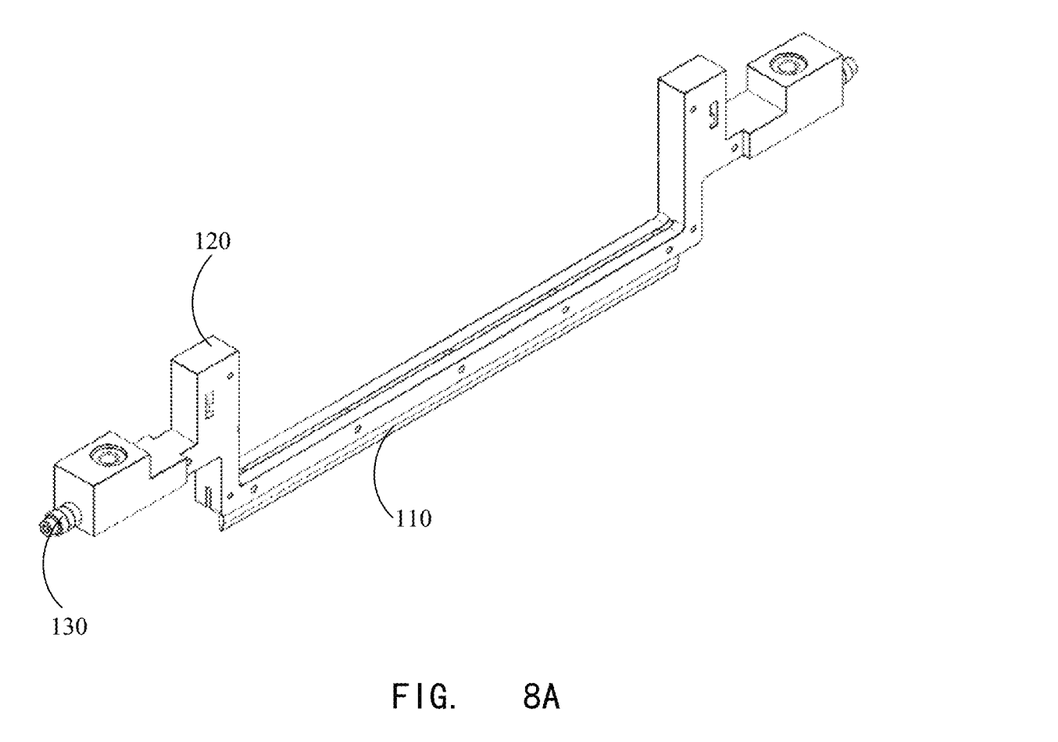
FIG. 8A is a three-dimensional schematic view of a scraper according to an embodiment of the present disclosure.
Figure 8B:
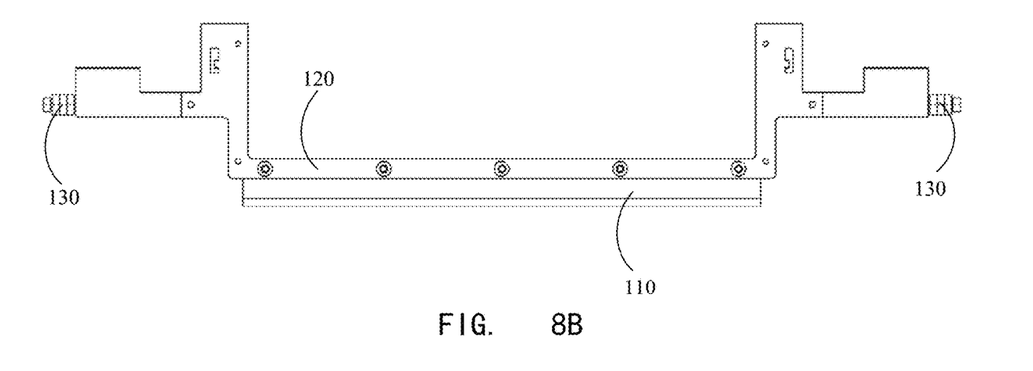
FIG. 8B is a front view of the scraper of an embodiment of the present disclosure.
Figure 8C:
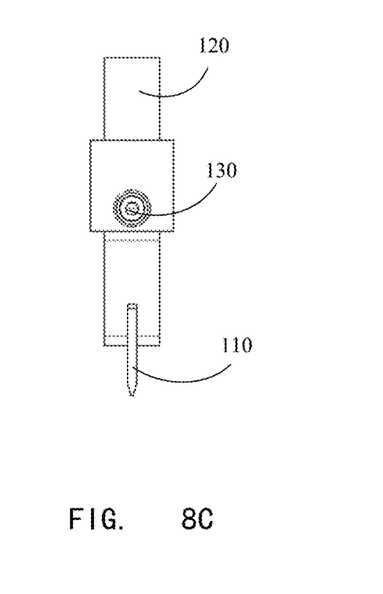
FIG. 8C is a side view of a scraper according to an embodiment of the present disclosure.

FIGS. 8A to 8C are schematic diagrams of the scraper 110 according to an embodiment of the present disclosure. FIG. 8A shows the scraper 110, the fixing frame 120 and the pulley 130 in the scraper component 100 according to an embodiment of the present disclosure. Referring to FIG. 8B, it can be seen that the scraper 110 is fixedly installed on the downwardly concave middle section of the fixing frame 120. In this embodiment, the length of the scraper 110 is smaller than the middle section of the fixing frame 120. Referring to FIG. 8C, in this embodiment, the scraper 110 is a thin sheet with an acute angle at one end to facilitate scraping the printing slurry at the bottom of the storage tank 200.

In one embodiment, the material of the scraper is rigid to facilitate the scraping of the printing slurry with higher viscosity.

In one embodiment, the bottom surface of the scraper used for scraping is smooth, which can reduce friction and make it easier to slide.

Although the foregoing disclosure uses various examples to discuss some disclosure embodiments that are currently considered useful, it should be understood that such details are only for illustrative purposes, and the appended claims are not limited to the disclosed embodiments. On the contrary, the claims are intended to cover all modifications and equivalent combinations that conform to the spirit and scope of the embodiments of the present disclosure. For example, although the system components described above can be implemented by hardware devices, they can also be implemented only by software solutions, such as installing the described system on an existing server or mobile device.

For the same reason, it should be noted that, in order to simplify the description of the disclosure of the present disclosure and help the understanding of one or more embodiments of the disclosure, in the foregoing description of the embodiments of the present disclosure, multiple features are sometimes combined into one embodiment, drawings or its description. However, this method of disclosure does not mean that an embodiment of the present disclosure requires more features than those mentioned in the claims. In fact, the features of the embodiment are less than all the features of the single embodiment disclosed above.

In some embodiments, numbers describing the number of ingredients and attributes are used. It should be understood that such numbers used in the description of the embodiments use the modifiers "approximately", "about" or "substantially" in some examples. Unless otherwise stated, "approximately", "about" or "substantially" indicates that the number is allowed to vary by ±20%. Correspondingly, in some embodiments, the numerical parameters used in the specification and claims are approximate values, and the approximate values can be changed according to the required characteristics of individual embodiments. In some embodiments, the numerical parameter should consider the prescribed effective digits and adopt the method of general digit retention. Although the numerical ranges and parameters used to confirm the breadth of the ranges in some embodiments of the present disclosure are approximate values, in specific embodiments, the setting of such numerical values is as accurate as possible within the feasible range.

What is claimed is:

1. A three-dimensional printing device, comprising:
a scraper, a fixing frame, a pulley and a sliding rail, the scraper is attached to the fixing frame, and the pulley is attached to at least one end of the fixing frame, wherein,
the sliding rail comprises a horizontal first rail and a tilted and movable second rail, a first end of the second rail is located in a groove of the first rail and a second end of the second rail is located above the first rail by a rotating shaft; and
the pulley is configured to travel on the first rail and the second rail, and in the groove.

2. The three-dimensional printing device according to claim 1, wherein each first rail has two ends, and the two ends are corresponding to two second rails respectively.

3. The three-dimensional printing device according to claim 1, wherein the scraper component has two first rails and two sets of the pulley, the two sets of pulleys are respectively placed at both ends of the fixing frame, and each set of the pulley is adapted to slide on one of the first rail.

4. The three-dimensional printing device according to claim 1, wherein the scraper has at least one long hole perpendicular to an extension direction of the scraper, and the scraper is attached to the fixing frame through the long hole.

5. The three-dimensional printing device according to claim 1, wherein the scraper is rigid.

6. The three-dimensional printing device according to claim 1, wherein the bottom surface of the scraper for scraping is smooth.

7. The three-dimensional printing device according to claim 1, wherein further comprising:
a driving device, which is for driving the fixing frame to move along the sliding rail, the driving mechanism comprises a motor, a transmission shaft, two transmission gears and two conveyor belts, the transmission shaft is connected to an output shaft of the motor, the two transmission gears are set at both ends of the transmission shaft, the two conveyor belts are respectively driven by the two transmission gears, and the two ends of the fixing frame are respectively attached to the two conveyor belts.

* * * * *